A. M. Smith.
Work Holder.

Nº 39966.  Patented Sept. 15. 1863

Witnesses
L. Hosford
Patrick Cass

Inventor
Albert M. Smith

UNITED STATES PATENT OFFICE.

ALBERT M. SMITH, OF NEW YORK, N. Y.

IMPROVEMENT IN SEWING-WORK HOLDERS.

Specification forming part of Letters Patent No. 39,966, dated September 15, 1863; antedated November 1, 1862.

*To all whom it may concern:*

Be it known that I, ALBERT M. SMITH, of the city, county, and State of New York, have invented a new and useful Improvement in Work and Skein Holders for the Lap; and I do declare that the following is a full, clear, and exact description of the construction and operation of the same, as shown in the annexed drawings, making a part of this specification, of which—

Figure 1:
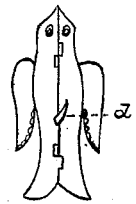
Figure 2:
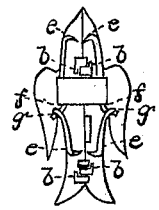
Figure 3:
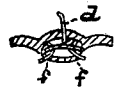
Figure 4:
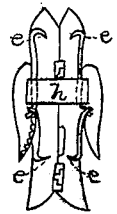
Figure 5:
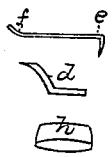
Figure 6:
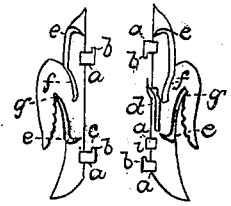

Figure 1 is a perspective view; Figs. 2 and 4, descriptive transverse views; Figs. 3 and 6, descriptive transverse sections; Fig. 5, a sectional view.

The nature of my invention consists in constructing a holder for holding work and skeins on the lap, in two sections, so arranged, hinged, and confined together that it can be attached to the lap by closing them together on the garment covering it, and will not become detached by ordinary use in whatever direction drawn on.

To enable others skilled in the art to make and use my invention, I will proceed to describe its construction and operation.

I make it in any form and shape, so as to be in two sections, either longitudinal or lateral, and hinged together either in the usual manner of hinges, or in any way equivalent, so that it can be attached to the lap by closing them together on the garment covering it; but generally I make it in the form and shape of a bird, and in two sections, and hinge them together by making bars on each section, as at *a a a a a*, Fig. 6, and hooking on one edge, as at *b b b b*, so that they will hook together with and over the base of those on the other section when put together, as at *b b b b*, Fig. 2. These bars when put together are held so by the hook *b* at *c*, Fig. 6, being bent back so as to catch on the opposite bar, *a i*, and as at Fig. 2.

I make a hook, as at *d*, Fig. 5, and fasten it to the under side of the edge of one section of the holder, as at *d*, Fig. 6, letting it come up through it by cutting again in it as seen, and so as to project up on the upper side of the holder when the sections are put together, as at *d d*, Figs. 1 and 3, to hold the work and skeins on. I arrange the lower part of each section designed to attach to the lap with sharp small points or hooks, by making them on them, or separate and fasten them to them, or in any way equivalent, so that by closing them together they can be caught into the garment toward each other, so as to hold in whatever direction drawn on; but generally I make them without the points on them, but separate, of pins or wire, as at *e*, Fig. 5, and fasten them to them, as at *e e e e*, Fig. 6, so that when the sections are put together and closed they stand as at *e e e e*, Fig. 2. I make a spring of rubber or metal and in the form of a band, spiral or otherwise, as shall be equivalent, and connect it to each section of the holder, so as to draw on them sufficient to confine them together to the garment covering the lap, by fastening the wires forming the points or separate pieces to them so that the end of one or both of them projects over the space where the wings join, or elsewhere, as shall be equivalent, and slipping or hooking it onto them; but generally I make it of a band of rubber, as at *h*, Fig. 5, and connect it to each section by fastening the wires forming the points to them, so that the end at *f*, Fig. 5, of one of them on each section extends over the space where the wings are, as at *f f*, Fig. 6, and slipping it over them, as at *f f*, Fig. 3, and then bending them back, so that they lock over the ends of the opposite points, *g g*, Fig. 6, as at *f g f g*, Fig. 2, so as to hold them. The holder is attached to the lap by opening it so that the points point downward, as at *e e e e*, Fig. 4, then placing it on the garment covering the lap, and closing or shutting it together on it, as at Figs. 1 and 2. Skeins are held on it to wind by attaching two to the lap, so that by extending it they can be thrown far enough apart and in position to place the skein on their hooks, used for holding the work.

I do not claim making or constructing a holder for the purpose as described, so that it can be attached to the lap by a point or points, hook or hooks, being caught into the garment covering it, or so that the work and skeins can be held on it by being caught on a hook or hooks; but What I do claim is—

1. The holder, as described, constructed in two sections, so arranged and hinged together that it can be attached to the lap by closing them together on the garment covering it, as described.

2. In combination with the foregoing, the spring $h$, in connection with the attachments $ff$ and $gg$ to the sections, substantially as and for the purpose herein described.

ALBERT M. SMITH.

Witnesses:
S. HOSFORD,
PATRICK CASS.